Jan. 20, 1970    W. H. MITCHELL    3,490,791
PIPE CONNECTOR
Filed March 16, 1967

INVENTOR
William H. Mitchell
BY
Mortenson and Weigel
ATTORNEYS

United States Patent Office 3,490,791
Patented Jan. 20, 1970

3,490,791
PIPE CONNECTOR
William H. Mitchell, Newark, Del., assignor to University of Delaware, Research Foundation, Inc., a corporation of Delaware
Filed Mar. 16, 1967, Ser. No. 623,627
Int. Cl. F16l 55/00; B05b 15/00
U.S. Cl. 285—5    6 Claims

ABSTRACT OF THE DISCLOSURE

A fluid distribution system includes a main feed pipe and a plurality of branch pipes each attached to the main feed pipe by a resilient tubular connector through an aperture in the side wall of the main feed pipe. The conduit has a grommet formed at one end to engage the aperture and to provide a shoulder which acts as a cushion between the end of the branch pipe and the wall of the feed pipe. The conduit is formed of a material having a high coefficient of friction relative to the pipe to prevent their being easily pulled apart.

---

The present invention relates to pipe connectors, and more particularly, to improved plastic, self-sealing pipe connectors.

In a conventional irrigation system, water from a suitable source, such as a reservoir, is piped through relatively large feed lines to the location to be irrigated. At this point, the feed lines are tapped either by various branch pipes going to an individual field and other areas to be irrigated or directly by lateral irrigation lines for distribution over the field itself through perforated pipe or tubing. The advent of low cost plastic tubing has made practical the irrigation of many areas heretofore totally dependent on weather. In a typical irrigation system, each acre of ground to be irrigated involves, depending upon the crops to be irrigated and the moisture characteristics of the soil, the use of some ten thousand feet of a suitable plastic tubing such as polyethylene tubing. Unfortunately, connections between segments of tubing or between the tubing and a branch line have used conventional connectors including ordinary plastic T's or saddle T's and adapters. Stainless steel clamps are required to clamp the ends of the pipes to the connectors. While this method is workable, unfortunately it is relatively expensive. These conventional pipe connectors make up more than one-half of the total cost of the irrigation system and place a severe restriction on the development of this method of irrigation.

It is desirable, therefore, to provide a relatively low cost connector that can be used to join large numbers of lateral irrigation lines to a common feeder line. The connectors in addition to being of low cost must function over varying water pressures of nominal pressure up to 30 pounds per square inch (p.s.i.). Furthermore, such connectors must be useful and operative over extensive periods of time and under adverse conditions, such as for long time periods (20 years) while buried in the soil.

It is an object of this invention to obviate many of the disadvantgaes inherent in the prior plastic pipe connectors. Another object of this invention is to provide an inexpensive pipe connector. Other aims appear hereinafter.

In accordance with a preferred embodiment of the invention, flexible pipe connectors for use in joining a large number of lateral polyethylene or similar irrigation lines to a common feeder line are constructed preferably of a flexible plastic such as polyvinylchloride. The connector comprises a flexible tubular conduit adapted to have one end friction fitted into one end of a branch pipe. At the other end of the connector, a flexible grommet is formed having an end flange and a boss adjacent the end flange. The flange and boss together define a peripheral groove about the connector. The flange and boss form, in effect, a flexible double shoulder. The outermost shoulder on the connector is forced through the hole in the pipe being processed and in place it conforms to the curvature of the inner wall of the pipe while the other shoulder contacts and conforms to the surface of the outside wall of the pipe. When the connector end bearing the flange is forced through a hole in the wall of the feeder line, the groove engages the wall. Once in place, the flange of the grommet conforms to the curvature of the inner wall of the feeder line and the water pressure within the feed-line forces the flange against the inner surfaces of the joined tubing to aid in maintaining a water tight seal.

The novel features that are considered characteristic of this invention are set forth with particularly in the appended claims. The invention itself, however, both as to its organization and method of operation, as well as additional objects and advantages thereof, will be best understood from the following description, given for illustrative purposes only, when read in connection with the accompanying drawings, in which:

Figure 1:
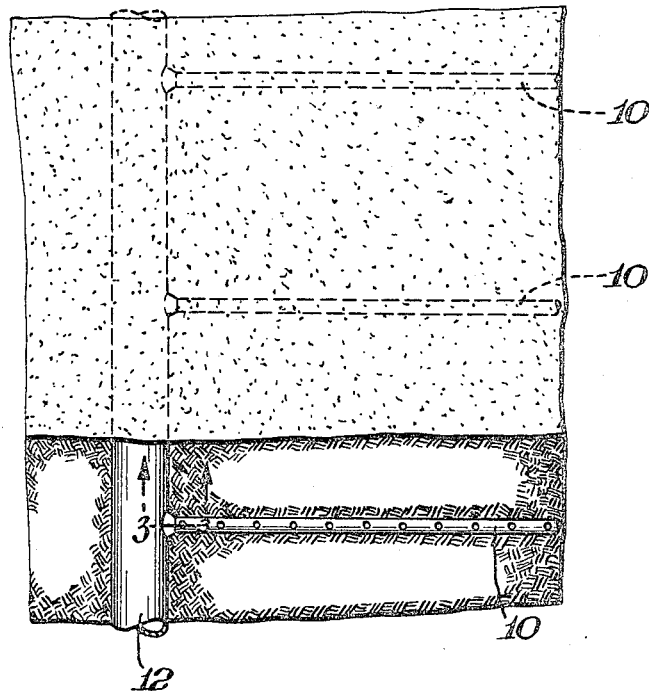
FIGURE 1 is a plan view of an irrigation system, the view being partly broken to show how the system utilizing the connector of this invention is buried.
Figure 2:
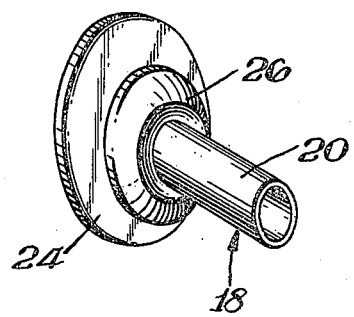
FIGURE 2 is a pictorial view of the connector of this invention.

There may be seen in FIG. 1 a typical irrigation system in which a large number of lateral or branch lines 10 of an irrigation system are joined to a common feeder line or pipe 12. Both the lateral and feeder pipes or lines 10 and 12, respectively, may be constructed of any suitable pipe but are preferably constructed of a relative rigid tubing such as polyethylene pipe. The pipes that are used may have smooth or rough or corrugated walls, inner or outer for the connectors of this invention make good, tight seals with these surfaces.

In accordance with this invention, each branch line is connected to the feeder line 12 by forming a hole or aperture 14 in the side wall 16 of the larger or feeder line 12. A connector 18 has a stub 20 at one end and a grommet 22 at the other end. The connector 18 is formed from a piece of relatively pliable or flexible (compared to the tubing used for the feeder and branch lines) plastic tubing such as polyvinyl chloride tubing. The stub end 20 consists of a straight section of the tubing having an outside diameter equal to or greater than (preferably slightly larger) than the inside diameter of the branch line 10 that is to be joined to the feed line 12 to achieve a friction fit. The diameter of the hole formed in the wall 16 of the feeder line 12 is less than or equal to (preferably slightly smaller) than the outside diameter of the stub 20 of the connector 18. Hence, the hole diameter is seen to be controlled by the diameter of the branch lines.

At the other end of the connector 18 the grommet 22 is formed by an end flange 24 and a boss 26 interiorly adjacent the flange 24. The flange 24 preferably has a diameter that is greater than the diameter of the boss 26 and is flexible such that it may be forced through the opening 14 in the side wall 16 of the feed line 12. Once in position the flange 24 will conform generally to the curvature of the inner wall of the feed ine 12. When water is introduced into the feed line 12 its pressure forces the flange 24 tightly against the inside walls of the feed line 12 such that within practical limits the tightness of the seal increases with the operating pressure of the fluid.

Figure 3:
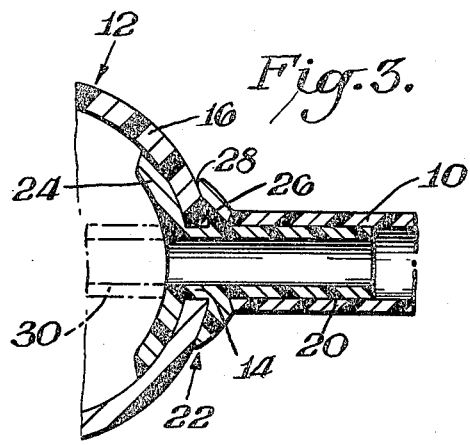
FIGURE 3 is a cross-sectional view taken through the section line 3—3 of FIG. 1 showing the structural details of the connector.

The boss 26 which remains on the exterior of the feed line 12 provides a shoulder against which the branch pipe 10 may be butted, as shown in FIG. 3, without affecting the water tight seal between the flange 24 and the inner wall of the feed line 12. Thus, this invention is seen to eliminate the need for cutting the feeder line, inserting a connector, and attaching clamps to secure the connector at either end to the feeder line. Both time and labor is saved. The peripheral groove 28 between flange 24 and boss 26 has a width less than or equal to the wall thickness of the feeder line 12.

Further, in accordance with this invention, by the selection of a material for the connector 18 that has a relatively high coefficient of friction with respect to the material used for the branch and feed lines 10 and 12, respectively, no steel clamps or other tying mechanism is required. Rather, the friction fit between the stub end 20 of the connector 18 and the branch line 10 is sufficient to prevent the branch line and the feeder line from pulling apart at the connector 18. In addition, by selecting the connector 18 of a material more flexible than that of the branch lines 10, the normal force exerted between the outer surface of the connector 18 and the inner wall of the branch line 10 increases with water pressure. Additionally, the pressure exerted against this junction by the surrounding soil once the pipeline is buried further aids in preventing the pipes from pulling apart. In operation no significant leakage has occurred under conditions in which the pipes are simply filled with water under no pressure and when the water has been under pressure as high as 40 p.s.i.

Also by selecting the connector 18 to be of a more flexible material than the lines 10 and 12, respectively, the pressure of the fluid within the pipes forces the flange 24 against and in conformity with the inner wall of the feed line 12 and in the same manner as the stub end 20 of the connector 18 conforms tightly against the inner wall of the branch pipe 10. It is for this reason that the branch lines 10 and feed line 12 may be constructed of any pipe so long as the aforesaid sealing contacts are effected. The branch and feeder line pipe must restrain the pliable connector 18 and either the pipes or the connector must have a high coefficient of friction to effect the holding of the one to the other.

In many cases it is possible to construct the connector to join lengths of the smaller diameter branch lines 10 together. In this instance the connector merely has two stub ends with a boss in the center portion against which the ends of the force fitted branch pipes abut. The abutment can be used to assure equal insertion of the connector into the pipe ends. In still another modification the connector is provided both with flange 24 and boss 26 and with an extension 30, shown in dotted lines in FIG. 3. The user can mount the second branch pipe on extension 30 with or without cutting off flange 24 to get more insert into the branch pipe. This latter modification precludes the need for stocking more than one device since it can be used as shown in FIG. 3 or in the joining of two pipe ends together.

One skilled in the art will recognize other modifications and equivalents are applicable. For example, he may wish to use pipes made of polypropylene or some other material such as natural or synthetic rubbers and to select his material for the connector to follow the principles set out above. However, the polyhydrocarbons are very inexpensive pipe materials and have excellent toughness, elasticity and chemical inertness and, therefore, they find extensive use in water transportation. Thus, the preferred connector of this invention is one made from polyvinyl chloride or a similar synthetic polymer which affords the flexibility and the friction properties described above.

The pressure insert connector of this invention is a relatively low cost, easily assembled connector having a relatively long life and the capability of functioning properly at the normal water pressures employed in irrigations systems. Metal parts which corrode or rust are not needed. Considerable savings in time and materials are effected.

While the invention has been disclosed herein in connection with certain embodiments and certain structural and procedural details, it is clear that changes, modifications or equivalents can be used by those skilled in the art; accordingly, such changes are within the principles of the invention.

What is claimed is:
1. A fluid distribution system comprising:
   a main feed pipe having an aperture in its side wall,
   a branch pipe,
   said branch pipe having an outer diameter greater than the aperture diameter,
   a resilient tubular conduit for joining said branch pipe to said main pipe through said aperture,
   said conduit having an outside diameter greater than the inside diameter of said branch pipe and one end friction fitted into one end of said branch pipe,
   said conduit having a flange formed on its other end and a radially extending boss formed intermediate said ends defining with said flange a peripheral groove,
   said flange, boss, and groove defining a grommet for mounting said conduit in said feed pipe aperture wherein said flange engages the inner wall of said feed pipe and said boss engage the outer wall of said feed pipe, the boss being engaged by end of branch pipe, and
   the bottom of said groove having a width substantially equal to the wall thickness of said feed pipe.

2. A distribution system according to claim 1 in which said conduit has a greater flexibility than said pipes, and
   said flange has a diameter exceeding that of said aperture, whereby fluid pressure exiting in said feed pipe when in operation forces said flange against the inner wall of said feed pipe providing a seal.

3. A distribution system according to claim 1, wherein said conduit is formed of a material having a relatively high coefficient of friction with respect to the materials used for said branch and feed pipes.

4. A distribution system according to claim 3 in which said conduit has a greater flexibility than said pipes, and said flange has a diameter exceeding that of said aperture, whereby fluid pressure existing in said feed pipe when in operation forces said flange against the inner wall of said feed pipe providing a seal.

5. A distribution system according to claim 1 wherein said feed pipe is generally circular in cross-section.

6. A fluid distribution system comprising:
   a main feed pipe having an aperture in its side wall,
   a branch pipe,
   said branch pipe having an outer diameter greater than the aperture diameter,
   a resilient tubular conduit for joining said branch pipe to said main pipe through said aperture,
   said conduit having an outside diameter greater than the inside diameter of said branch pipe and one end friction fitted into one end of said branch pipe,
   said conduit having a flange formed on its other end and a radially extending boss formed intermediate said ends defining with said flange a peripheral groove,
   said flange, boss, and groove defining a grommet for mounting said conduit in said feed pipe aperture wherein said flange engages the inner wall of said feed pipe and said boss engages the outer wall of said feed pipe, the boss being engaged by said one end of the branch pipe, the bottom of said groove having a width substantially equal to the wall thickness of said feed pipe,
   said conduit having a greater flexibility than said pipes, and
   said pipes being made of polyethylene tubing and said conduit being made of polyvinyl chloride tubing, thereby providing a high coefficient of friction between said conduit and each of said pipes.

References Cited

UNITED STATES PATENTS

| | | | |
|---|---|---|---|
| 2,470,359 | 5/1949 | McLean | 285—109 |
| 2,897,533 | 8/1959 | Bull et al. | 285—110 X |
| 3,277,234 | 10/1966 | Dekko et al. | 285—208 X |
| 3,360,283 | 12/1967 | Guthrie | 285—110 |
| 3,067,783 | 12/1962 | Berland | 285—238 X |

FOREIGN PATENTS

| | | |
|---|---|---|
| 655,518 | 1/1965 | Belgium. |
| 902,508 | 8/1962 | Great Britain. |

THOMAS F. CALLAGHAN, Primary Examiner

U.S. Cl. X.R.

285—110, 162, 208. 423